(12) United States Patent
Ishikawa et al.

(10) Patent No.: US 11,703,081 B2
(45) Date of Patent: Jul. 18, 2023

(54) ROLLING BEARING

(71) Applicant: NTN Corporation, Osaka (JP)

(72) Inventors: Takanori Ishikawa, Shizuoka (JP); Takashi Kawai, Shizuoka (JP); Nozomi Isobe, Shizuoka (JP)

(73) Assignee: NTN CORPORATION, Osaka (JP)

(*) Notice: Subject to any disclaimer, the term of this patent is extended or adjusted under 35 U.S.C. 154(b) by 41 days.

(21) Appl. No.: 17/439,122

(22) PCT Filed: Mar. 9, 2020

(86) PCT No.: PCT/JP2020/010013
§ 371 (c)(1),
(2) Date: Sep. 14, 2021

(87) PCT Pub. No.: WO2020/189372
PCT Pub. Date: Sep. 24, 2020

(65) Prior Publication Data
US 2022/0145932 A1 May 12, 2022

(30) Foreign Application Priority Data

Mar. 15, 2019 (JP) .................. 2019-048738

(51) Int. Cl.
*F16C 33/58* (2006.01)
*F16C 35/077* (2006.01)
(Continued)

(52) U.S. Cl.
CPC .............. *F16C 19/06* (2013.01); *F16C 19/36* (2013.01); *F16C 33/583* (2013.01); *F16C 35/077* (2013.01)

(58) Field of Classification Search
CPC ........ F16C 19/06; F16C 19/36; F16C 19/364; F16C 33/583; F16C 33/586; F16C 35/077
See application file for complete search history.

(56) References Cited

U.S. PATENT DOCUMENTS

| | | | | |
|---|---|---|---|---|
| 4,696,587 A | * | 9/1987 | Nishida ................. | F16C 33/586 384/585 |
| 6,280,095 B1 | * | 8/2001 | Furukoshi ............. | F16C 33/768 384/489 |

(Continued)

FOREIGN PATENT DOCUMENTS

| | | | |
|---|---|---|---|
| CN | 204140647 U | * | 2/2015 |
| DE | 102016009588 A1 | * | 2/2018 |

(Continued)

OTHER PUBLICATIONS

Translation of Written Opinion of the International Searching Authority dated Jun. 9, 2020 in International (PCT) Application No. PCT/JP2020/010013.

(Continued)

*Primary Examiner* — Phillip A Johnson
(74) *Attorney, Agent, or Firm* — Wenderoth, Lind & Ponack, L.L.P.

(57) ABSTRACT

A rolling bearing includes an outer ring as a fixed ring, an inner ring as a rotary ring, and rolling elements disposed between the outer ring and the inner ring. The outer ring includes, on the radially opposite side of its raceway surface, a fitting surface fitted to a mating member, two annular grooves in which elastic members are fitted, and a recess adjacent to the annular grooves, and the recess has a bottom surface having an outer diameter smaller than the outer diameter of the fitting surface.

12 Claims, 4 Drawing Sheets

(51) Int. Cl.
 *F16C 19/06* (2006.01)
 *F16C 19/36* (2006.01)

(56) References Cited

U.S. PATENT DOCUMENTS

| | | | | |
|---|---|---|---|---|
| 7,736,064 | B2 * | 6/2010 | Kusano | F16C 35/067 |
| | | | | 384/537 |
| 2010/0014794 | A1 * | 1/2010 | Iida | F16C 27/066 |
| | | | | 384/489 |
| 2016/0061254 | A1 * | 3/2016 | Varnoux | H02K 7/08 |
| | | | | 310/90 |
| 2017/0138404 | A1 | 5/2017 | Taniguchi et al. | |
| 2019/0078615 | A1 * | 3/2019 | Mori | F16C 35/077 |
| 2020/0040903 | A1 * | 2/2020 | Iizuka | F04D 29/056 |

FOREIGN PATENT DOCUMENTS

| | | | | |
|---|---|---|---|---|
| EP | 2208900 | A1 * | 7/2010 | F16C 23/08 |
| JP | 60-152071 | | 10/1985 | |
| JP | 63-115925 | | 7/1988 | |
| JP | 10159841 | A * | 6/1998 | F16C 19/52 |
| JP | 2006-132709 | | 5/2006 | |
| JP | 2007-78137 | | 3/2007 | |
| JP | 2008008409 | A * | 1/2008 | F16C 35/077 |
| JP | 2009-287658 | | 12/2009 | |
| JP | 2010101364 | A * | 5/2010 | F16C 33/60 |
| JP | 2014005897 | A * | 1/2014 | F16C 33/783 |
| JP | 2015-215061 | | 12/2015 | |
| JP | 2017-89845 | | 5/2017 | |

OTHER PUBLICATIONS

International Search Report dated Jun. 9, 2020 in International (PCT) Application No. PCT/JP2020/010013.
Extended European Search Report dated Apr. 5, 2022 in corresponding European Patent Application No. 20773725.5.
Communication pursuant to Article 94(3) EPC dated Feb. 17, 2023 in corresponding European Patent Application No. 20773725.5.

* cited by examiner

ROLLING BEARING

TECHNICAL FIELD

The present invention relates to a rolling bearing.

BACKGROUND ART

Shafts of automotive transmissions are rotatably supported by rolling bearings.

In recent years, in order to reduce the sizes and weights of transmissions for automobiles, thereby reducing the fuel consumption of the automobiles, bearing rings of rolling bearings or a transmission housing used in such automotive transmissions have a reduced wall thickness. As a result, the fixed ring of such a rolling bearing could creep relative to the housing, depending on the specifications and the load conditions of the rolling bearing.

In order to reduce such creeping, a rolling bearing is known in which O-rings are fitted in peripheral grooves formed on both axial sides of the outer peripheral surface of the fixed ring (see Japanese Unexamined Patent Application Publication No. 2015-215061).

PRIOR ART DOCUMENT(S)

Patent Document(s)

Patent document 1: Japanese Unexamined Patent Application Publication No. 2015-215061

SUMMARY OF THE INVENTION

Problems to be Solved by the Invention

However, in the rolling bearing of Japanese Unexamined Patent Application Publication No. 2015-215061, O-rings having a large diameter are mounted in order to reduce creeping, and thus the fixed ring needs to have an increased wall thickness. Therefore, it is difficult to realize both the reduction of creeping and the size reduction of the rolling bearing.

It is an object of the present invention to provide a rolling bearing of which not only the creeping is reduced, but also the size is reduced.

Summary of the Invention

In order to achieve the above object, the present invention provides a rolling bearing comprising: a fixed ring having a raceway surface; a rotary ring rotatable relative to the fixed ring; and rolling elements disposed between the fixed ring and the rotary ring; wherein the fixed ring includes, on a radially opposite side of the raceway surface of the fixed ring; a fitting surface fitted to a mating member; at least one annular groove in which an elastic member is fitted; and a recess adjacent to the at least one annular groove, and having a bottom surface having an outer diameter smaller than an outer diameter of the fitting surface.

Effects of the Invention

For the rolling bearing of the present invention, it is possible to realize both the reduction of creeping and the size reduction of the rolling bearing.

DETAILED DESCRIPTION OF THE INVENTION

Figure 1:
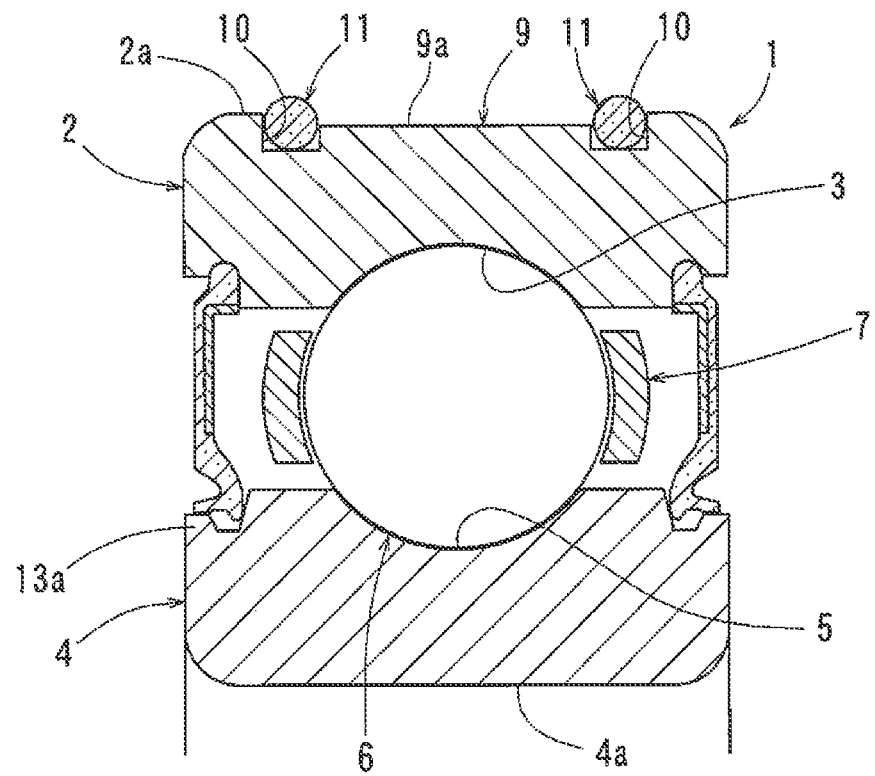
FIG. 1 is a sectional view of a rolling bearing according to a first embodiment of the present invention.

The rolling bearing 1 according to the first embodiment of the present invention is now described with reference to FIGS. 1 to 3. The rolling bearing 1 of this embodiment is a rolling bearing for an automobile used in, e.g., an automotive transmission as described later. As illustrated in FIG. 1, the rolling bearing 1 is a ball bearing including an outer ring 2, an inner ring 4 disposed radially inwardly of the outer ring 2, a plurality of balls 6, as rolling elements, disposed between the outer ring 2 and the inner ring 4, and a cage 7.

The ball bearing 1 is the inner ring rotation type; that is, the outer ring 2 is fixed, and the inner ring 4 is rotatable relative to the outer ring 2. However, the ball bearing 1 may be the outer ring rotation type, i.e., the outer ring 2 may be the rotary ring.

As used herein, "axial", "axially", and "axial direction" refer to the direction along the center axis of the ball bearing 1; "radial", "radially" and "radial direction" refer to a direction orthogonal to the center axis of the ball bearing 1; and "circumferential", "circumferentially" and "circumferential direction" refer to the direction about the center axis of the ball bearing 1.

The outer ring 2 has, on its inner periphery, a raceway surface 3 on which the balls 6 roll. The raceway surface 3 can come into contact with the balls 6 at a nominal contact angle of 0 (zero) degrees around the entire circumference thereof.

The outer ring 2 has, on its outer periphery, i.e., on the radially opposite side of the raceway surface 3, a fitting surface 2a, a recess 9, and at least one annular groove 10 (a plurality of annular grooves in this embodiment). The fitting surface 2a comprises cylindrical surface portions disposed on both axial sides of the outer peripheral surface of the outer ring 2. The outer ring 2 has chamfers between the axial ends of the outer ring 2 and the fitting surface 2a.

To the fitting surface 2a, a housing H (e.g., a housing of an automotive transmission) as a mating member is fitted. The outer ring 2 is fitted to the housing H with a clearance fit. During operation, due to radial loads applied to the ball bearing 1, the fitting surface 2a of the outer ring 2 and the housing H come into contact with each other.

Figure 2:
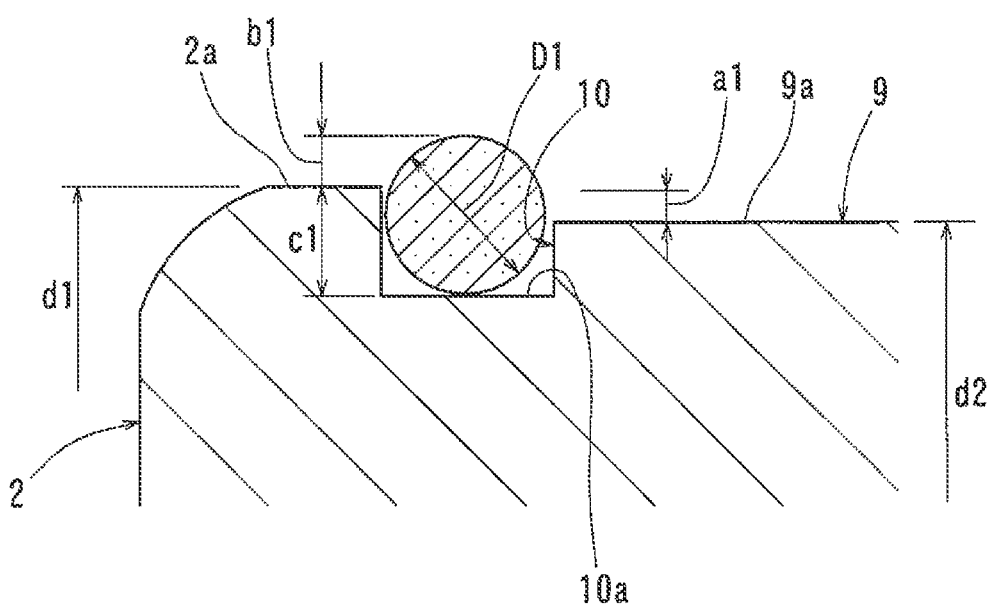
FIG. 2 is an enlarged sectional view of a portion of the rolling bearing of FIG. 1.
Figure 3:
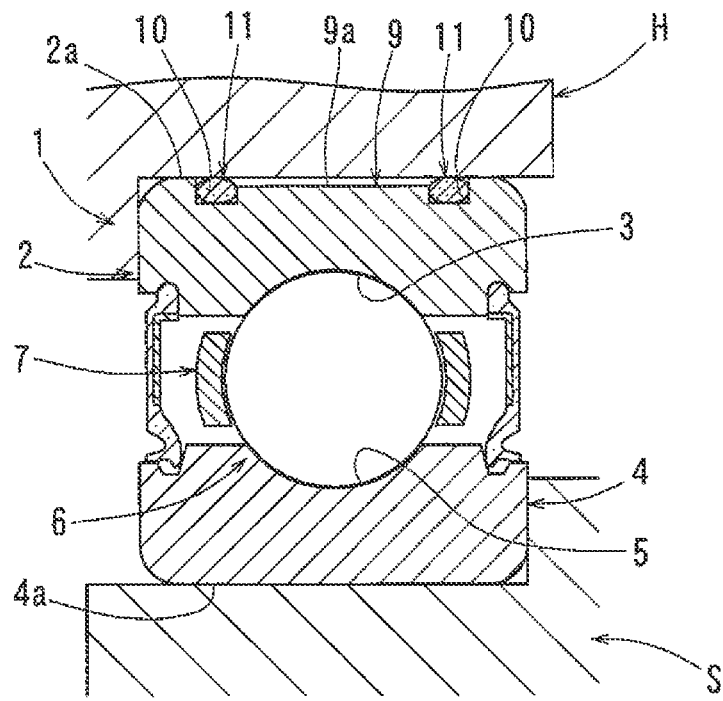
FIG. 3 is a sectional view of the rolling bearing of FIG. 1 while fitted to a housing.

As illustrated in FIG. 2, the recess 9 is disposed at an axially central portion of the outer peripheral surface of the outer ring 2 such that the axial positions of the recess 9 and the raceway surface 3 overlap with each other. The recess 9 has a cylindrical bottom surface 9a. The bottom surface 9a has an outer diameter smaller than the outer diameter of the fitting surface 2a, and has an axial length larger than the axial length of the fitting surface 2a. The axial end edges of the bottom surface 9a are located axially outwardly of the respective axial end edges of the raceway surface 3.

In this embodiment, the recess 9 has a depth a1 set such that, during operation, the bottom surface 9a of the recess 9 cannot come into contact with the housing H fitted to the fitting surface 2a. In this embodiment, the depth a1 of the recess 9 is calculated by (d1−d2)/2, where d1 is the outer diameter dimension of the fitting surface 2a of the outer ring 2, and d2 is the outer diameter dimension of the bottom surface 9a.

By setting the depth a1 of the recess 9 at various values, the wear resistance of the bottom surface 9a and whether the ball bearing 1 can be sufficiently reduced in size were evaluated. The evaluation results are shown in Table 1, in which the symbol ◯ means "good", and the symbol X means "bad".

TABLE 1

|  | a 1 (mm) | Wear resistance | Reduced size | Overall evaluation |
|---|---|---|---|---|
| Comparative Example 1 | 0.04 | X | ◯ | X |
| Example 1 | 0.05 | ◯ | ◯ | ◯ |
| Example 2 | 0.10 | ◯ | ◯ | ◯ |
| Example 3 | 0.20 | ◯ | ◯ | ◯ |
| Example 4 | 0.30 | ◯ | ◯ | ◯ |
| Example 5 | 0.40 | ◯ | ◯ | ◯ |
| Example 6 | 0.50 | ◯ | ◯ | ◯ |
| Comparative Example 2 | 0.60 | ◯ | X | X |

Table 1 shows that, where the depth1 a1 of the recess 9 is smaller than 0.05 mm, during operation, the bottom surface 9a comes into contact with the housing H and becomes worn. Table 1 also shows that, where the depth1 a1 of the recess 9 is larger than 0.5 mm, in order to reduce the strain of the outer ring 2 continuously caused by rolling element loads during the operation of the ball bearing 1, it is necessary to increase the wall thickness of the outer ring between the bottom surface 9a and the raceway surface 3, thus making it difficult to reduce the size of the ball bearing 1. Therefore, it turned out from the overall evaluations that the optimum depth a1 of the recess 9 is 0.05 mm≤a1≤0.50 mm.

The recess 9 is adjacent to the annular grooves 10. The annular grooves 10 are two annular grooves disposed in the outer peripheral surface of the outer ring 2. The annular grooves 10 are disposed axially outwardly of the recess 9 and between the recess 9 and the fitting surface 2a. The annular grooves 10 each has a cylindrical groove bottom surface 10a having a groove depth c1, from the fitting surface 2a, larger than the depth a1 of the recess 9, also from the fitting surface 2a.

Annular elastic members 11 are fitted with a predetermined interference in the respective annular grooves 10. The elastic members 11 are O-rings made of, e.g., nitrile rubber, acrylic rubber, fluororubber, or silicon rubber.

With the elastic members 11 fitted in the respective annular grooves 10, a portion of each elastic member 11 radially protrudes beyond the fitting surface 2a by a protrusion amount b1. When the fitting surface 2a of the outer ring 2 is fitted to the housing H, the elastic members 11 are radially compressed by the housing H. The sectional shape of the elastic members 11 is not limited to a circular shape, and may be a polygonal shape or a V-shaped shape.

By setting, at various values, the compressed amount X of each elastic member 11 when compressed by the housing H, relative to the diameter D1 of the elastic member 11, the creep resistance of the bottom surface 9a and the assemblability of the ball bearing 1 were evaluated. The evaluation results are shown in Table 2, in which the symbol ◉ means "extremely good", the symbol ◯ means "good", and the symbol X means "bad".

TABLE 2

|  | X/D1 (%) | Creep resistance | Assemblability | Overall evaluation |
|---|---|---|---|---|
| Comparative Example 1 | 3 | X | ◉ | X |
| Example 1 | 5 | ◯ | ◉ | ◯ |
| Example 2 | 10 | ◯ | ◯ | ◯ |
| Example 3 | 15 | ◯ | ◯ | ◯ |
| Example 4 | 20 | ◉ | ◯ | ◯ |
| Comparative Example 2 | 25 | ◉ | X | X |
| Comparative Example 3 | 30 | ◉ | X | X |

Table 2 shows that, where the compressed amount X is smaller than 5% of the diameter D1 of the elastic member 11, when the outer ring 2 is fitted to the housing H, the restoring force and the tightening force due to the elastic deformation of the elastic member 11 are small, and thus creeping cannot be reduced. Table 2 also shows that, where the compressed amount X is larger than 20% of the diameter D1 of the elastic member 11, it is difficult to fit the outer ring 2 to the housing H, and thus assemblability deteriorates.

Therefore, it turned out from the overall evaluations that the optimum value of the compressed amount X by which each elastic member 11 is compressed by the housing H is 5 to 20% of the diameter D1, i.e., the radial thickness, of the elastic member 11, and up to the protrusion amount b1 by which the elastic member 11 protrudes beyond the fitting surface 2a. The diameter D1 of the elastic member 11 refers to the diameter when the elastic member 11 is fitted in the annular groove 10 and not compressed by the housing H.

The inner ring 4 has, on its outer periphery, a raceway surface 5 on which the balls 6 roll. The raceway surface 5 can come into contact with the balls 6 at a nominal contact angle of 0 (zero) degrees around the entire circumference thereof.

The inner ring 4 has, on its inner periphery, a fitting surface 4a to which a rotary shaft S (e.g., a rotary shaft of an automotive transmission) as a mating member is fitted. The balls 6 are retained by the cage 7.

When, during operation of the ball bearing 1, rolling element loads are applied to the raceway surface 3 of the outer ring 2, the bottom surface 9a of the recess 9, located radially opposite to the raceway surface 3, deforms into a wavy shape. Since, when the ball bearing 1 rotates, the balls 6 also revolve around the center axis of the bearing, the wavy deformation of the bottom surface 9a occurs along the circumferential direction.

In this embodiment, since the recess 9 has a depth a1 set such that, during operation, the bottom surface 9a of the recess 9 cannot come into contact with the housing H, a radial gap remains between the housing H and the bottom surface 9a of the recess 9 (during operation).

Due to such a radial gap, even when the bottom surface 9a of the recess 9 in the outer ring 2 deforms into a wavy shape as described above, the bottom surface 9a is kept out of contact with the housing H. Therefore, it is possible to prevent the wavy deformation of the bottom surface 9a from acting as a traveling wave which causes the outer ring 2 to creep.

In other words, during operation of the ball bearing 1, the outer ring 2 comes into contact with the housing H only at the fitting surface 2a. Therefore, it is only required that the frictional forces of the elastic members 11 when compressed by the housing H be large enough to reduce the creeping of the outer ring 2 only at its fitting surface 2a, which is in contact with the housing H. Therefore, it is possible to reduce the frictional forces of the elastic members 11 in the ball bearing 1, compared to conventional ball bearings including no recess 9.

The frictional forces of the elastic members 11 can be reduced by reducing the radial dimensions (diameters D1) of the elastic members 11. Therefore, due also to the presence of the recess 9, it is possible to reduce the depths c1 of the annular grooves 10 in the outer ring 2.

By reducing the depths c1 of the annular grooves 10, it is not necessary to increase the wall thickness of the outer ring 2. Therefore, it is possible to not only reduce creeping but also reduce the size of the ball bearing 1.

Figure 4:
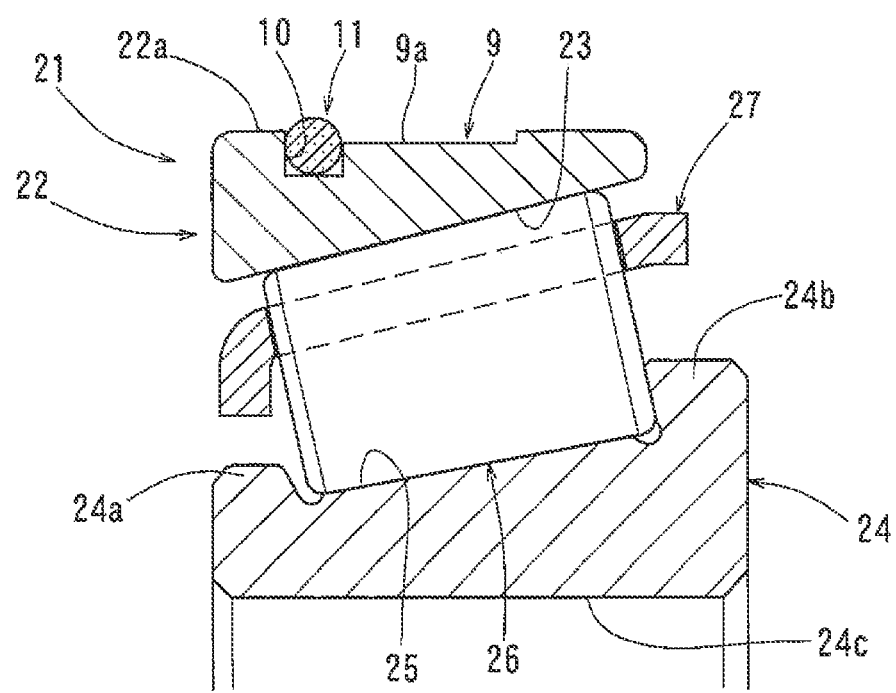
FIG. 4 is a sectional view of a rolling bearing according to a second embodiment of the present invention.
Figure 5:
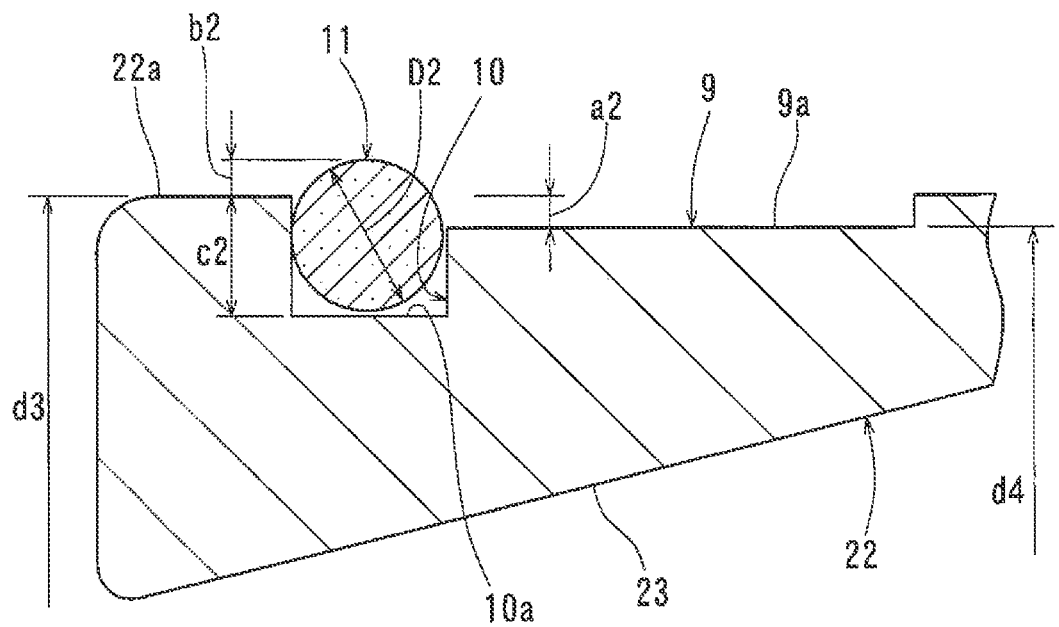
FIG. 5 is an enlarged sectional view of a portion of the rolling bearing of FIG. 4.
Figure 6:
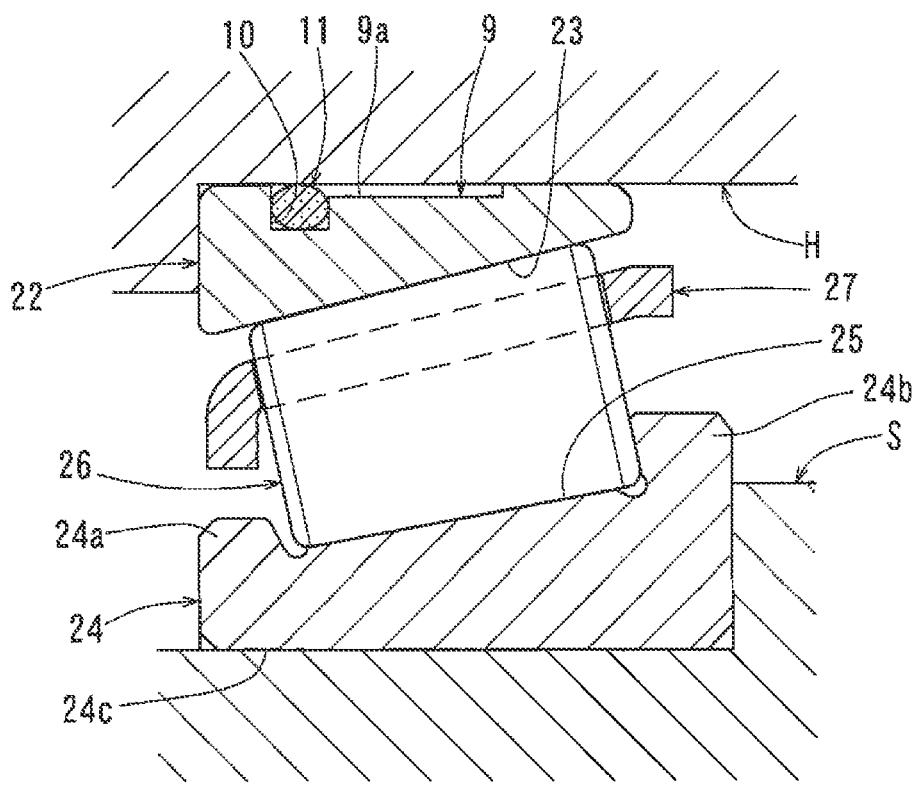
FIG. 6 is a sectional view of the rolling bearing of FIG. 4 while fitted to a housing.

FIGS. 4 to 6 illustrate a rolling bearing according to the second embodiment of the present invention. The rolling bearing 21 of this embodiment is a tapered roller bearing unlike the first embodiment. Only the features of the second embodiment different from those of the first embodiment are described below, and the elements of the second embodiment identical in structure to those of the first embodiment are denoted by the same reference numerals.

The tapered roller bearing 21 includes an outer ring 22, an inner ring 24 disposed radially inwardly of the outer ring 22, a plurality of tapered rollers 26, as rolling elements, disposed between the outer ring 22 and the inner ring 24, and a cage 27 retaining the tapered rollers 26.

The tapered roller bearing 21 is the inner ring rotation type, i.e., the outer ring 22 is fixed, and the inner ring 24 is rotatable relative to the outer ring 22.

The outer ring 22 has, on its inner periphery, a raceway surface 23 on which the tapered rollers 26 roll. The outer ring 22, has on its outer periphery, i.e., on the radially opposite side of the raceway surface 23, a fitting surface 22a, a recess 9, and a single annular groove 10. The fitting surface 22a includes portions disposed on both axial sides of the outer peripheral surface of the outer ring 22. During operation, due to radial loads applied to the tapered roller bearing 21, the fitting surface 22a of the outer ring 22 and the housing H come into contact with each other.

The recess 9 has an axial width dimension smaller than the roller lengths of the tapered rollers 26. The recess 9 is located axially inwardly of both end surfaces of the tapered rollers 26.

As illustrated in FIG. 5, the recess 9 has a depth a2 set such that, during operation, the bottom surface 9a of the recess 9 cannot come into contact with the housing H fitted to the fitting surface 22a. The depth a2 of the recess 9 is calculated by (d3−d4)/2, where d3 is the outer diameter dimension of the fitting surface 22a of the outer ring 22, and d4 is the outer diameter dimension of the bottom surface 9a of the recess 9. In the embodiment, the depth d2 is 0.05 to 0.50 mm.

The annular groove 10 is disposed axially outwardly of the recess 9 so as to be located at one end of the outer ring, i.e., the end of the outer ring on the axially back surface side of the bearing. The annular groove 10 has a radial groove depth c2 relative to the fitting surface 22a, the depth c2 being larger than the depth a2 of the recess 9 relative to the fitting surface 22a.

With an elastic member 11 fitted in the annular groove 10, a portion of the elastic member 11 radially protrudes beyond the fitting surface 22a by a protrusion amount b2. The compressed amount X by which the elastic member 11 is compressed by the housing H is set to be 5 to 20% of the diameter D2, i.e., the radial thickness, of the elastic member 11, and up to the protrusion amount b2 by which the elastic member 11 protrudes beyond the fitting surface 22a.

The inner ring 24 includes, on its outer periphery, a raceway surface 25 on which the tapered rollers 26 roll; a small flange 24a located on the small-diameter side (one axial side) of the raceway surface 25; and a large flange 24b located on the large-diameter side (the other axial side) of the raceway surface 25.

The inner ring 24 has, on its inner periphery, a fitting surface 24c which extends in the circumferential direction, and to which a rotary shaft S (e.g., a rotary shaft of an automotive transmission) as a mating member is fitted.

As described above, the tapered roller bearing 21 of the second embodiment includes, on the radially opposite side of the raceway surface 23, a radial recess 9 formed in the fitting surface 22a of the outer ring 22, and having a depth a2 set such that, during operation, the bottom surface 9a of the recess 9 cannot come into contact with the housing H fitted to the fitting surface 22a.

During operation of the tapered roller bearing 21, a radial gap remains between the housing H and the bottom surface 9a of the recess 9. Due to such radial gap, even when the bottom surface 9a of the recess 9 in the outer ring deforms into a wavy shape as described above, the bottom surface 9a is kept out of contact with the housing H. Therefore, it is possible to prevent creeping as in the ball bearing 1 of the first embodiment.

Also, during operation of the tapered roller bearing 21, the housing H is in contact with only the portions of the fitting surface 22a of the outer ring 22 that are located axially outwardly of the recess 9. Therefore, it is possible to reduce the frictional force of the elastic member 11 in the second embodiment as in the first embodiment, compared to conventional bearings of which the fitting surface of the outer ring comes into contact with the housing along the entire axial width of the fitting surface.

Figure 7:
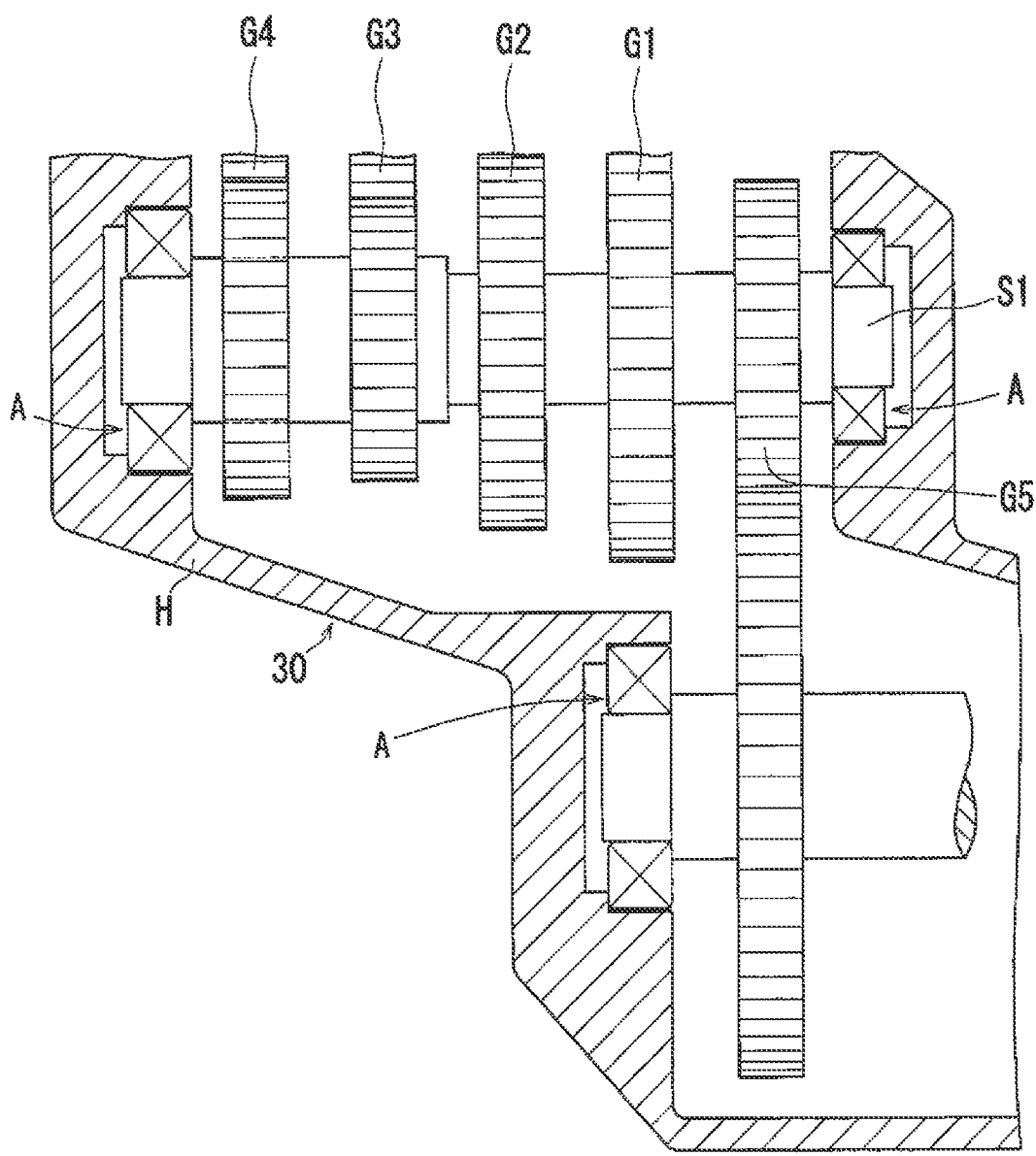
FIG. 7 is an enlarged sectional view of a transmission including rolling bearings according to the present invention.

FIG. 7 illustrates a transmission for an automobile in which rotary shafts are supported by rolling bearings according to the above first or second embodiment.

The transmission 30 of FIG. 7 is a multi-speed transmission, which changes the gear ratio in a stepwise manner. It includes rolling bearings A according to the above first or second embodiment fitted to the housing H (a portion of the case of the transmission), and rotatably supporting rotary shafts (such as an input shaft (not shown) and an output shaft S1).

The shown transmission includes an input shaft to which the rotation of the engine is inputted; an output shaft S1 extending parallel to the input shaft; a plurality of gear trains G1 to G4 that transmit the rotation of the input shaft to the output shaft S1; and clutches (not shown) mounted between the input shaft and the respective gear trains G1 to G4, or between the output shaft S1 and the respective gear trains G1 to G4. By selectively engaging any one of the clutches, the rotation of the input shaft is transmitted through the selected one of the gear trains G1 to G4 to the output shaft S1 in the selected gear ratio. The rotation of the output shaft S1 is outputted to an output gear G5, and the rotation of the output gear G5 is transmitted to e.g., a differential.

The transmission is configured such that lubricating oil splashed due to the rotation of the gears, or lubricating oil injected through nozzles (not shown) located within the housing H is supplied to the side surfaces of the rolling bearings A.

For the rolling bearing according to each of the above first and second embodiments, during operation, a gap remains between the housing H and the fitting surface 2a, 22a of the outer ring 2, 22, more particularly, the housing H and the bottom surface 9a of the recess 9 are kept out of contact with each other. Therefore, it is not necessary to retain grease in the recess 9 beforehand.

DESCRIPTION OF REFERENCE NUMERALS

1: Rolling bearing (ball bearing)
2: Outer ring
2a: Fitting surface
3: Raceway surface
4: Inner ring
4a: Fitting surface
5: Raceway surface
6: Ball (rolling element)
9: Recess
9a: Bottom surface
10: Annular groove
11: Elastic member
21: Rolling bearing (tapered roller bearing)
22: Outer ring
22a: Fitting surface
23: Raceway surface
24: Inner ring
25: Raceway surface
26: Tapered roller (rolling element)

The invention claimed is:

1. A rolling bearing comprising:
   a fixed ring having a raceway surface;
   a rotary ring rotatable relative to the fixed ring; and
   rolling elements disposed between the fixed ring and the rotary ring;
   wherein the fixed ring includes, on a radially opposite side of the raceway surface of the fixed ring:
   a fitting surface fitted to a mating member;
   an annular groove in which an elastic member is fitted; and
   a recess adjacent to the annular groove, the recess having a bottom surface having an outer diameter smaller than an outer diameter of the fitting surface.

2. The rolling bearing according to claim 1, wherein a compressed amount of the elastic member by which the elastic member is compressed by the mating member is set to be 5% to 20% of a radial thickness of the elastic member.

3. The rolling bearing according to claim 2, wherein the recess has a depth of 0.05 mm to 0.50 mm.

4. The rolling bearing according to claim 3, wherein the rolling elements are balls,
   wherein the annular groove is a first annular groove of a plurality of annular grooves, and
   wherein the recess is disposed between the plurality of annular grooves.

5. The rolling bearing according to claim 3, wherein the rolling elements are tapered rollers.

6. The rolling bearing according to claim 2, wherein the rolling elements are balls,
   wherein the annular groove is a first annular groove of a plurality of annular grooves, and
   wherein the recess is disposed between the plurality of annular grooves.

7. The rolling bearing according to claim 2, wherein the rolling elements are tapered rollers.

8. The rolling bearing according to claim 1, wherein the recess has a depth of 0.05 mm to 0.50 mm.

9. The rolling bearing according to claim 8, wherein the rolling elements are balls,
   wherein the annular groove is a first annular groove of a plurality of annular grooves, and
   wherein the recess is disposed between the plurality of annular grooves.

10. The rolling bearing according to claim 8, wherein the rolling elements are tapered rollers.

11. The rolling bearing according to claim 1, wherein the rolling elements are balls,
    wherein the annular groove is a first annular groove of a plurality of annular grooves, and
    wherein the recess is disposed between the plurality of annular grooves.

12. The rolling bearing according claim 1, wherein the rolling elements are tapered rollers.

* * * * *